Sept. 5, 1967  C. BRATTON ET AL  3,339,348
AIR FILTER CLEANER

Filed June 10, 1963  2 Sheets-Sheet 1

INVENTOR.
CLEON BRATTON and
BY   BUREN C. CRANE

Lockwood, Woodard, Smith & Weikart
Attorneys

Sept. 5, 1967　　　　　C. BRATTON ETAL　　　　　3,339,348
AIR FILTER CLEANER

Filed June 10, 1963　　　　　　　　　　　　　　2 Sheets-Sheet 2

INVENTORS.
CLEON BRATTON and
BUREN C. CRANE
BY
Lockwood, Woodard, Smith & Weikart
Attorneys United States Patent Office 3,339,348
Patented Sept. 5, 1967

3,339,348
AIR FILTER CLEANER
Cleon Bratton and Buren C. Crane, Lebanon, Ind., assignors, by mesne assignments, to Microtron Corporation, Charlotte, N.C., a corporation of North Carolina
Filed June 10, 1963, Ser. No. 286,557
9 Claims. (Cl. 55—294)

This invention relates generally to devices for cleaning air filters, and more particularly, it relates to a filter cleaner adapted to automatically traverse the surface of an air filter and remove dirt, lint, and the like, therefrom.

The conventional filter for air circulating systems and particularly air heating and cooling systems is an expensive and complex device, due to the fact that provisions must be made for efficient filtration even though substantial quantities of dirt and other foreign material may accumulate within the filter structure. In order to simplify conventional filter structures, it has been proposed to provide a relatively simple filter structure consisting of a conventional filter medium which may be cleaned periodically by means of a vacuum cleaning device. Such cleaning devices have not been completely successful because of the difficulty in simplifying the vacuum cleaning apparatus and at the same time retaining efficient cleaning capabilities.

For example, certain prior art filter structures consist of a cylindrical filter having a rotatable cleaning device mounted within the interior of the filter. Another conventional apparatus comprises a filter which may be wound on spaced reels and which may be cleaned by operating the reels to pass the filter through a cleaning apparatus. These and other prior art filter structures are unduly expensive and complex. The foregoing and other types of conventional filter cleaning devices are also undesirable in that they require excessively large sources of vacuum. This is because of the fact that vacuum is simultaneously applied to relatively large areas of the filter.

The aforementioned disadvantages and shortcomings of prior art devices have, to a large extent, been overcome by a filter cleaner which is disclosed in a copending application of Paul R. Honan and Cleon Bratton, entitled, Filter Cleaner, Ser. No. 195,690, filed May 18, 1962, now Patent No. 3,147,098. The present invention is an additional advance in the art which still further overcomes the shortcomings of prior art devices.

It is, therefore, a general object of the present invention to provide a simplified filter structure suitable for employment in a variety of gas circulating systems and a simplified and inexpensive means for the cleaning of filter elements in the structure.

It is a further object of the present invention to provide a cleaning unit for air filters or the like which may be operated continuously or for predetermined time periods to clean the filter without at anytime interfering with the air flow through the filter which is required for the normal operation of the circulating system in which it is employed.

It is a still further object to provide a cleaner unit which can achieve the desired results while at the same time employing a comparatively small source of vacuum.

It is a still further object to provide a cleaning unit which can be driven by a single motor without requiring a reversible motor or a reversible gearing mechanism.

In accordance with this invention there is provided a filter and filter cleaning assembly comprising a frame having a filter unit mounted therein, a cleaning unit supported for movement from one end of the filter unit to the other and having a vacuum cleaning head slidably mounted thereon, driving means coupled to said cleaning unit for continuously moving said cleaning unit across the surface of said filter unit in one direction, and driving means mounted on said cleaning unit and coupled to said vacuum head for moving said vacuum head in steps across said filter unit in the other direction when said cleaning unit reaches each extremity of its movement in said one direction.

The full nature of the invention will be understood from the accompanying drawings and the following description and the claims.

This invention comprises an assembly including a filter unit and a filter cleaning means which is adapted to replace conventional filters which are attached to air circulating or air cooling systems. This assembly may also be associated with air circulating and air cooling systems as original equipment.

Figures 1, 5:
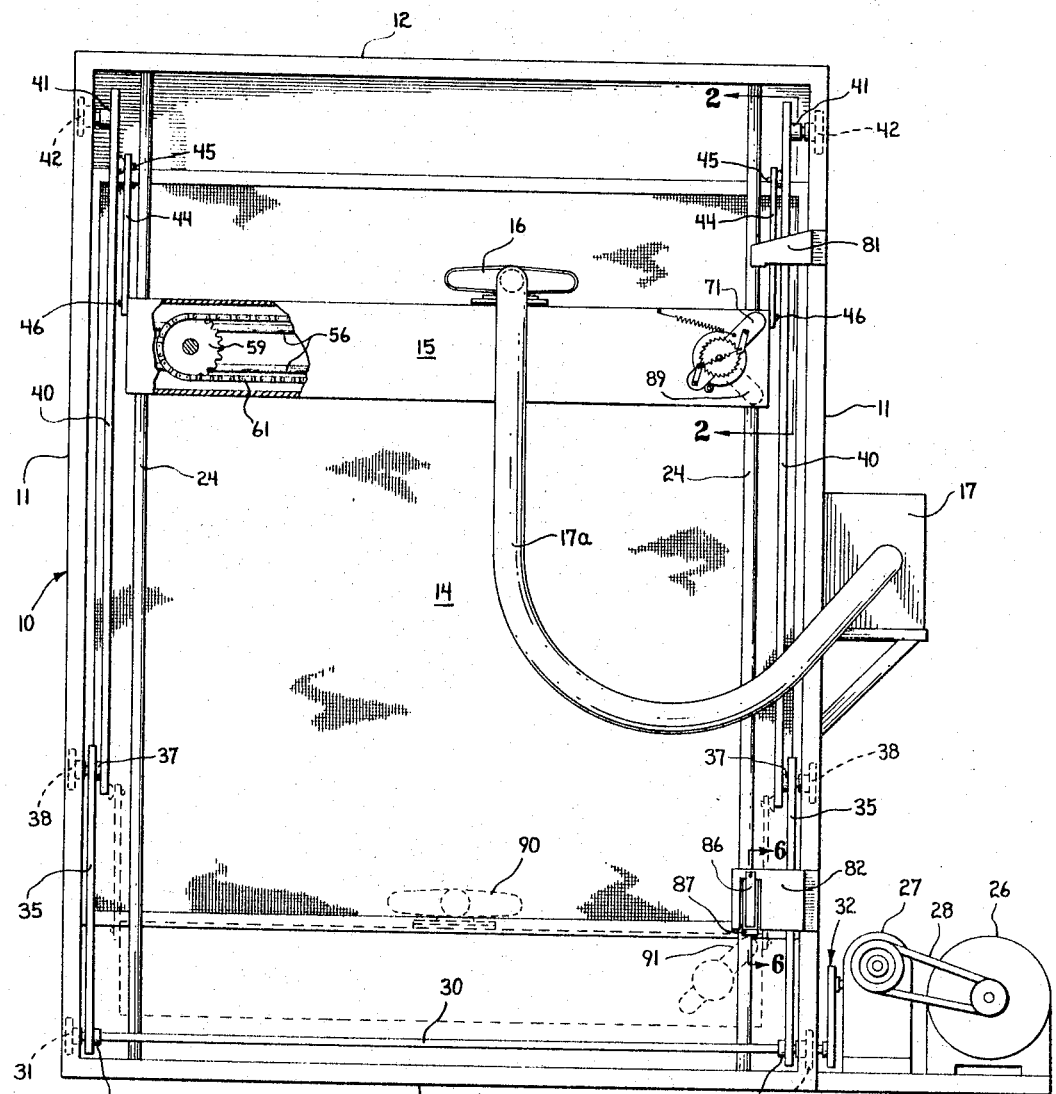
FIG. 1 is a front elevation of a typical embodiment of the present invention.
FIG. 5 is an enlarged front elevation showing details of the stepping mechanism.
Figure 2:
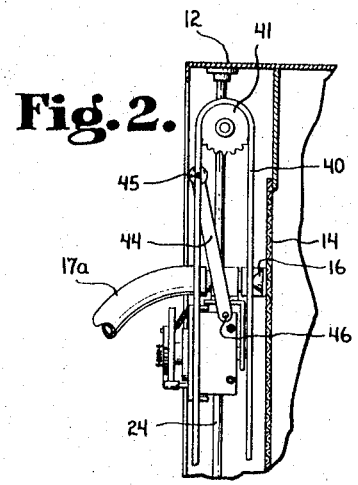
FIG. 2 is a fragmentary side elevation and partial cross-section of the typical embodiment taken on line 2—2 of FIG. 1.

Referring to the drawings, the assembly comprises a rectangular frame 10 which may be formed of channel members including side members 11 and end members 12. Any conventional air filtering member 14 may be attached in any suitable manner to the side members 11 and end members 12 of the frame as illustrated in FIG. 1.

For cleaning the filter 14 there is provided a transverse support or carriage 15 on which may be slidably mounted a vacuum cleaning head 16 positioned closely adjacent one face of filter 14 so as to apply a suction cleaning force to the filter. A source of vacuum 17 may be connected to head 16 by flexible hose 17a. The transverse support or carriage 15 includes at each end thereof bracket members 18 (FIG. 3) which have portions 19 welded or otherwise attached to the transverse carriage 15. Members 18 also include side portions 20 and end members 21 for carrying bushings 22. Vertical rods 24 are suitably attached to the end members 12 of the frame 10, and the transverse carriage 15 is slidably supported on the rods by the bushings 22 whereby the transverse carriage is slidably mounted for movement vertically or longitudinally in both directions; i.e., reciprocatory motion, from one end of filter 14 to the other.

For driving and imparting reciprocatory movement to carriage 15 substantially throughout the length of filter 14, there is provided a motor 26 coupled to a reduction gear 27 by means of a belt 28. A drive shaft 30 may be mounted on the lower ends of frame side members 11 by means of the bearing blocks 31 for rotation by reduction gear 27 through a belt drive 32. Shaft 30 carries at opposite ends thereof sprockets 34 for driving chains 35 which, in turn, drive double sprockets 37 mounted on bearing blocks 38. For connecting the transverse carriage 15 to the drive mechanism so far described, there are provided two endless belt members in the form of roller chains 40 coupled to the double sprockets 37 and also to sprockets 41 mounted at the upper end of the frame 10 on bearing blocks 42. Sprockets 37, 41 serve as wheel members over which belt members 40 are mounted. The transverse carriage 15 is connected to roller chains 40 through link arms 44 pivotally connected to chains 40 by pins 45 and pivotally connected to the carriage 15 by pins 46.

It will be apparent that motor 26 drives the chains 40 through the reduction gear 27, belt 32 and chains 35 whereby chains 40 travel continuously. As the pins 45 travel upwardly with the chains 40 the carriage 15 also travels upwardly. As the pins 45 travel around the sprockets 41 they move downwardly, thereby moving the carriage 15 in a downward direction. The same is true when the pins 45 travel around the sprockets 37 whereby downward movement is reversed, and the carriage 15 again moves upwardly.

Figure 3:
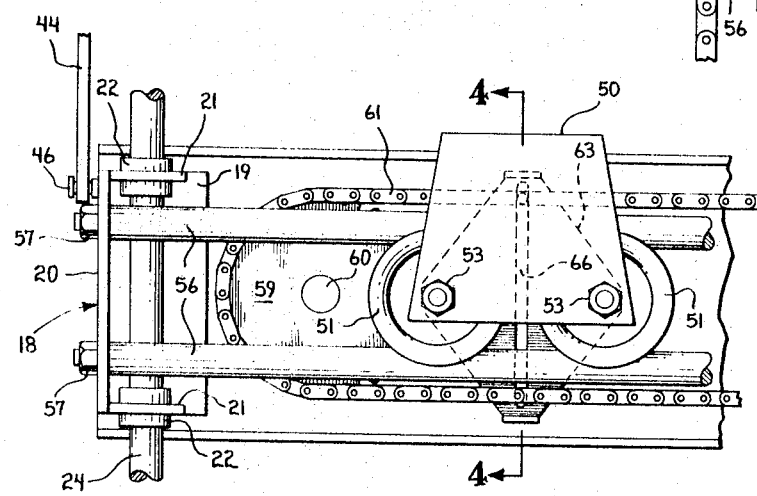
FIG. 3 is an enlarged fragmentary rear elevation showing some details of the vacuum head and means for the driving thereof transversely of the unit.
Figure 4:
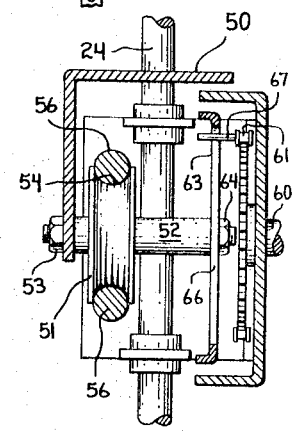
FIG. 4 is a section taken along the line 4—4 in FIG. 3.

Referring to FIGS. 3, 4 and 5, the vacuum head 16 may be mounted on the bracket 50 carried by a pair of wheels 51 supported on axles 52 bolted to bracket 50 by means of the nuts 53. Wheels 51 are grooved as indicated at 54 to ride on the rods 56 which extend the full length of the carriage 15 and are fastened to the member 20 of bracket 18 by means of the nuts 57.

For driving and imparting transverse reciprocatory motion to the bracket 50 and the vacuum head in a stepwise manner and in timed relation to at least certain longitudinal movements of carriage 15, there is provided vacuum head drive means comprising wheels or a pair of sprockets 59, each of which is mounted adjacent one end of carriage 15 by means of an axle 60. An endless belt member or roller chain 61 may be mounted over and driven by the sprockets 59. The bracket 50 may be connected to chain 61 by means of a plate 63 bolted to each of the axles 52 by means of the nuts 64. Plate 63 may be slotted at 66 to received the free end of a pin 67 fastened in any suitable manner to the roller chain 61. Assuming that chain 61 carries pin 67 to the left in FIG. 3, the bracket 50 will be moved to the left until pin 67 moves downwardly in slot 66 as the pin moves around the circumference of sprocket 59. When pin 67 approaches the lower portion of slot 66, the motion of bracket 50 will be reversed, and it will move to the right as shown in FIG. 3. Thus, chain 61 will impart reciprocatory motion to vacuum head 16 transversely of and substantially throughout the width of filter 16 and relative to carriage 15.

For driving chain 61 one of the sprockets 59, serving as a drive wheel or drive sprocket, may be connected to a one-way clutch type of mechanism comprising a ratchet wheel 70 (FIG. 5) fixed to the axle 60 and thus coupled to the drive sprocket 59. For rotating the ratchet wheel 70 intermittently there is provided an actuating bar 71 rotatably mounted on axle 60 and biased into engagement with a stop member 72 by means of a coil spring 73 hooked to the bar 71 at 74 and hooked to the carriage 15 at 75. Bar 71 may be coupled to ratchet wheel 70 by means of a pair of pawls 77 pivotally mounted to bar 71 as indicated at 78. Pawls 77 may be biased into engagement with the ratchet wheel by means of a coil spring 79 connected to the free ends of the pawls as indicated at 80. It will be apparent that when the bar 71 is moved in a clockwise direction the sprocket 59 will rotate therewith through a predetermined angle of revolution and move the chain 61 together with the bracket 50 a predetermined distance which will be approximately the width of the vacuum head 16.

Figure 6:
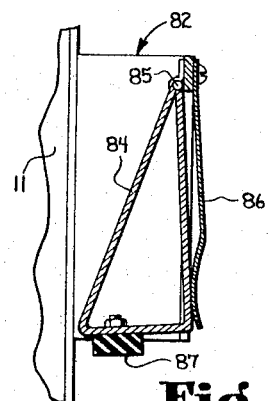
FIG. 6 is an enlarged cross-section taken on line 6—6 of FIG. 1.

For operating the bar 71 there is provided an upper stop member 81 (FIG. 1) fastened to one of the frame members 11 and a lower stop member 82 also fastened to the latter frame member 11. The lower stop member 82 includes a triangular member 84 (FIG. 6) pivoted to member 82 as indicated at 85. Spring 86 is arranged to normally hold the member 84 in the position indicated in FIG. 6. A shock absorbing rubber block 87 may be secured to the base of member 84 as shown in FIG. 6.

It will be understood that motor 26 may be intermittently or continuously operated to move the vacuum head support or carriage 15 upwardly and downwardly in a reciprocatory manner over the surface of the filter 14.

The stop 81 is located on the frame at such a position that when vacuum head 16 reaches the upper edge of the filter, the bar 71 will have engaged stop 81 and will have moved downwardly to the dotted line position indicated at 89 (FIG. 1). This movement will have operated the chain 61 to step head 16 crosswise of the filter a distance approximately equal to the width of the head 16.

Similarly, when the vacuum head support or carriage 15 is moved in a downward direction to the dotted line position indicated at 90, the bar 71 will have engaged member 84 and moved it outwardly and will assume the dotted line position indicated at 91. At this stage of operation the movement of carriage 15 will be in an upward direction and bar 71 will engage the rubber block 87 and will be rotated downwardly to again step the vacuum head horizontally a distance approximately equal to its width. In this fashion successive strips of the filter 14 will be subjected to vacuum, and any accumulated dirt will be removed from the outer surface of the filter.

Figure 7:
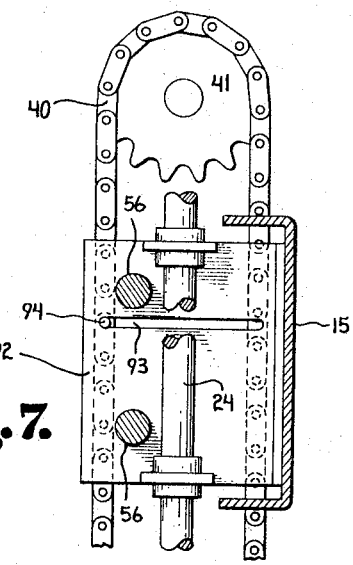
FIG. 7 is a fragmentary enlarged side elevational view of a second embodiment wherein a drive pin on the conveyor belt engages a slot in the sideplates of the carriage support to drive the latter rather than driving by the use of links.

Referring to FIG. 7 of the drawings, an alternative means of coupling the support or carriage 15 to the roller chain 40 is illustrated therein. A plate 92 may be welded or otherwise attached to carriage 15 and may include a horizontal slot 93 for receiving the pin 94 similar to pins 45 and connected in any suitable manner to chain 40. It will be understood that a plate 92 may be connected to each end of the support or carriage 15 whereby both of the chains 40 will drive support 15. It will further be understood that the sprockets 37 and 41 may be located in such a manner that the vacuum head 16 will reach the upper and lower edges of the filter unit as pin 94 travels around the outer periphery of the sprockets. As the pin 94 travels around the sprockets it will slide through slot 93 and effect reversal of the carriage 15 and the vacuum head.

From the foregoing description it will be apparent that this invention provides a simplified and inexpensive apparatus adapted to continuously or intermittently remove accumulated dirt from a filter. Normal operation of the air circulating system is not interrupted, and the efficiency of the filter is maintained at a maximum because dirt cannot accumulate and impair flow of air through the filter.

The invention claimed is:

1. A filter assembly comprising a frame, a filter mounted in said frame, a carriage disposed transversely of said frame and filter, means for mounting said carriage for movement longitudinally of said filter, carriage drive means coupled to said carriage for imparting reciprocatory motion thereto substantially throughout the length of said filter, a vacuum cleaning head positioned closely adjacent one face of the filter so as to apply a suction cleaning force to the filter, means for mounting said head on said carriage for movement transversely of said filter, vacuum head drive means on said carriage, and means to operate said vacuum head drive means in timed relation to certain longitudinal movements of said carriage for imparting reciprocatory motion to said head transversely of and substantially throughout the width of said filter and relative to said carriage.

2. A filter assembly according to claim 1 wherein said carriage drive means comprises a pair of continuously moving endless members supported on said frame and extending longitudinally thereof adjacent opposite ends of said carriage, and means linking each end of said carriage to an adjacent one of said members.

3. A filter assembly according to claim 2 wherein said endless members are endless roller chains.

4. A filter assembly according to claim 1 wherein said head drive means comprises a drive sprocket mounted at one end of said carriage, an idler sprocket mounted at the other end of said carriage, an endless roller chain on said sprockets, means coupling said head mounting means to said chain, and means coupled to said drive sprocket and operable to rotate said drive sprocket through a predetermined angle of revolution.

5. A filter assembly according to claim 4 wherein said sprocket rotating means comprises a ratchet wheel on said carriage and coupled to said drive sprocket, a rotatable pawl mechanism coupled to said ratchet wheel and movable with said carriage, and said frame includes a pair of spaced stop members disposed in the path of movement of said pawl mechanism for rotating said pawl mechanism when said carriage passes said stop members.

6. A filter assembly according to claim 1 wherein said carriage drive means comprises a first pair of wheel members spaced for disposal adjacent each end of said filter and to one side of said carriage, a second pair of wheel members similarly disposed on the other side of said carriage, an endless belt member mounted over each of said pairs of wheel members, means for attaching each end of said carriage to the respective belt member, and means for driving said belt members for reciprocating said carriage longitudinally with respect to said filter.

7. A filter assembly according to claim 1 wherein said head drive means comprises a drive wheel mounted at one end of said carriage, an idler wheel mounted at the other end of said carriage, an endless belt member mounted over said wheels in driving relation thereto, means coupling said head mounting means to said belt member, and means coupled to said drive wheel and operable to rotate said drive wheel through a predetermined angle of revolution.

8. A filter assembly according to claim 7 wherein said wheel rotating means comprises a one-way clutch, and said frame includes means for momentarily operating said clutch at the end of each longitudinal movement of said carriage.

9. A filter assembly comprising a filter, an elongate carriage extending substantially parallel to and adjacent one face of said filter, means for imparting reciprocating movement to said carriage relative to said filter in a direction transversely of said elongate carriage and in strokes of a length corresponding substantially with the length of said filter, a vacuum head mounted for movement longitudinally of said carriage and connected to a source of suction for applying a suction cleaning force through said vacuum head to said filter, normally inactive head drive means carried by said carriage and operatively connected to said vacuum head for moving the same longitudinally of said carriage, and means responsive to each of at least some of said strokes of said carriage for actuating said drive means to move said vacuum head a predetermined distance longitudinally of said carriage.

References Cited
UNITED STATES PATENTS

| | | | |
|---|---|---|---|
| 2,516,680 | 7/1950 | Culpepper | 55—294 X |
| 2,596,518 | 5/1952 | Bahnson | 55—291 |
| 3,147,098 | 9/1964 | Honan | 55—294 |

HARRY B. THORNTON, *Primary Examiner.*

S. W. SOKOLOFF, *Assistant Examiner.*